(12) United States Patent
Gubrinski et al.

(10) Patent No.: US 12,054,390 B2
(45) Date of Patent: Aug. 6, 2024

(54) PROCESS AND PLANT FOR REMOVAL OF ACIDIC GAS CONSTITUENTS FROM SYNTHESIS GAS CONTAINING METAL CARBONYLS

(71) Applicant: L'Air Liquide, Société Anonyme pour l'Etude et l'Exploitation des Procédés Georges Claude, Paris (FR)

(72) Inventors: Alfred Gubrinski, Erzhausen (DE); Sophia Schmidt, Frankfurt am Main (DE); Dorit Rappold, Frankfurt (DE); Diana-Maria Gomez-Lozano, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 924 days.

(21) Appl. No.: 16/975,739

(22) PCT Filed: Feb. 22, 2019

(86) PCT No.: PCT/EP2019/025052
§ 371 (c)(1),
(2) Date: Aug. 26, 2020

(87) PCT Pub. No.: WO2019/166128
PCT Pub. Date: Sep. 6, 2019

(65) Prior Publication Data
US 2020/0407221 A1     Dec. 31, 2020

(30) Foreign Application Priority Data

Feb. 27, 2018   (EP) ..................... 18400005

(51) Int. Cl.
*C01B 3/52*      (2006.01)
*B01D 53/14*     (2006.01)

(52) U.S. Cl.
CPC ............ *C01B 3/52* (2013.01); *B01D 53/1425* (2013.01); *B01D 53/1462* (2013.01);
(Continued)

(58) Field of Classification Search
None
See application file for complete search history.

(56) References Cited

U.S. PATENT DOCUMENTS

2002/0178917 A1    12/2002  Grunewald et al.
2005/0035326 A1*   2/2005   Meyer ................ B01D 53/1425
                                                      252/62

FOREIGN PATENT DOCUMENTS

DE    27 59 124    7/1979
DE    43 36 790    5/1995
(Continued)

OTHER PUBLICATIONS

Ullmann's Encyclopedia of Industrial Chemistry, 6$^{th}$ Ed. vol. 15, 399-407.
(Continued)

*Primary Examiner* — Jason M Greene
(74) *Attorney, Agent, or Firm* — Elwood L. Haynes

(57) ABSTRACT

The invention relates to a process for removal of unwanted, in particular acidic, gas constituents, for example carbon dioxide and hydrogen sulfide, from a crude synthesis gas containing metal carbonyls by gas scrubbing with a scrubbing medium. According to the invention water is added directly into the feed conduit of the methanol water mixture containing metal sulfides before the introduction thereof into the methanol-water separating column and/or water is injected directly into the methanol-water separating column at at least one point. This avoids deposits or encrustations of metal sulfide particles in the methanol-water separating column.

10 Claims, 1 Drawing Sheet

(52) U.S. Cl.
CPC .............. *B01D 2252/2021* (2013.01); *C01B 2203/0415* (2013.01); *C01B 2203/0475* (2013.01); *C01B 2203/048* (2013.01); *C01B 2203/0485* (2013.01); *C01B 2203/0495* (2013.01)

(56) References Cited

FOREIGN PATENT DOCUMENTS

| | | |
|---|---|---|
| DE | 197 16 310 | 10/1998 |
| DE | 103 36 677 | 3/2005 |

OTHER PUBLICATIONS

International Search Report and Written Opinion for corresponding PCT/EP2019/025052, Apr. 8, 2019.

\* cited by examiner

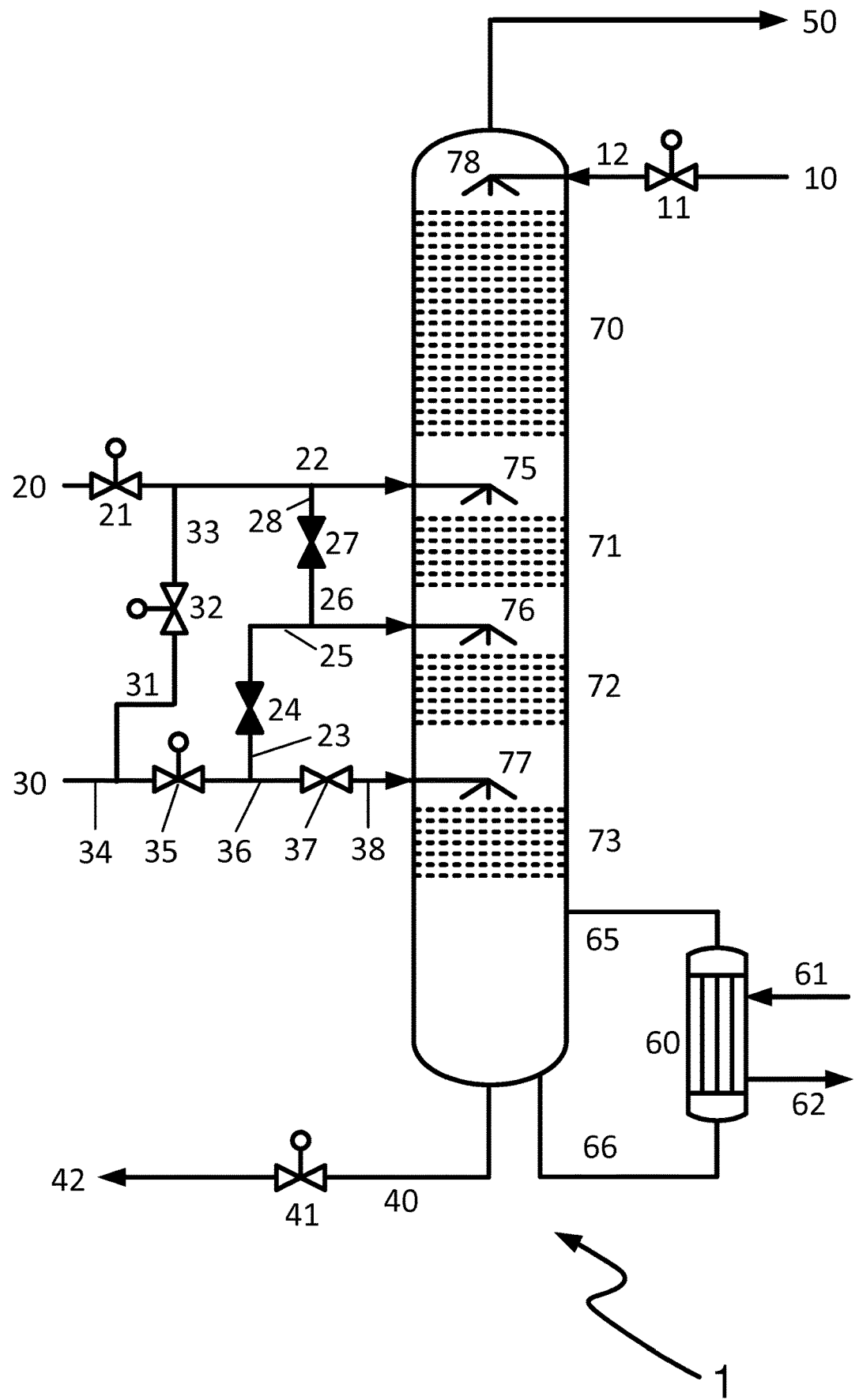

PROCESS AND PLANT FOR REMOVAL OF ACIDIC GAS CONSTITUENTS FROM SYNTHESIS GAS CONTAINING METAL CARBONYLS

CROSS REFERENCE TO RELATED APPLICATIONS

This application is a 371 of International Application No. PCT/EP2019/025052, filed Feb. 22, 2019, which claims priority to European Patent Application No. 18400005.7, filed Feb. 27, 2017, the entire contents of which are incorporated herein by reference.

BACKGROUND

Field of the Invention

The invention relates to a process for removal of unwanted, in particular acidic, gas constituents, for example carbon dioxide and hydrogen sulfide, from a crude synthesis gas containing metal carbonyls by gas scrubbing with a scrubbing medium. The invention further relates to a plant for performing such a process.

Prior Art

Processes for removal of unwanted concomitants from industrial crude gases by means of physical or chemical absorption or gas scrubbing are well-known from the prior art. Thus, such processes can reliably remove unwanted, acidic constituents from crude synthesis gases produced by gasification or reforming of carbonaceous feedstocks, for example carbon dioxide ($CO_2$) and hydrogen sulfide ($H_2S$), but also further constituents such as carbonyl sulfide (COS) and hydrogen cyanide (HCN), from the desirable synthesis gas constituents of hydrogen ($H_2$) and carbon monoxide (CO) down to the trace range. A known and frequently employed process is the Rectisol process, which is described in principle in Ullmann's Encyclopedia of Industrial Chemistry, 6th ed., vol. 15, p. 399 ff. In the Rectisol process, the abovementioned unwanted disruptive components are absorbed by cold methanol, i.e. methanol cooled significantly below ambient temperature, as an absorbent or scrubbing medium, intensive mass transfer between the crude gas and the scrubbing agent or absorbent taking place in an absorber column, also referred to as scrubber column. The solubility of the unwanted gas constituents increases drastically with falling methanol temperature and increasing pressure while remaining virtually constant for hydrogen and carbon monoxide. Methanol additionally has the advantage of still having a low viscosity and thus good mass transfer and heat transfer properties even at temperatures down to −75° C.

In the Rectisol process the methanol laden with the disruptive components, which is used as scrubbing medium, is circulated through regeneration apparatuses. In the regeneration apparatuses, the laden methanol is freed of the absorbed gases by physical means. This comprises removing $CO_2$ from the laden methanol scrubbing medium in a first regeneration step by expansion (so-called flash regeneration) and/or stripping with a gas, for example nitrogen. In a further or alternative regeneration step, the sulfur-containing gases, COS and $H_2S$, are stripped by heating (so-called hot regeneration). It is often an objective to produce a very substantially $CO_2$-free COS/$H_2S$ gas since economically interesting further processing thereof is impaired by mixing with $CO_2$.

In the Rectisol process, a distinction is made between the standard process and the selective Rectisol process. In the standard Rectisol process, the accompanying COS/$H_2S$ gases and the $CO_2$ are removed from the crude synthesis gas together in one absorption step. By contrast, in the so-called selective Rectisol process, the sulfur-containing accompanying COS/$H_2S$ gases and the $CO_2$ are each separated from the crude synthesis gas in separate, successive absorption steps. This selective absorption is made possible by suitable adjustment of the process parameters, especially the quantitative ratio of scrubbing medium and gas to be absorbed. The advantage of selective absorption is that the COS/$H_2S$ gas and the $CO_2$ are very largely kept separate even in the absorption and only the smaller portion requires separation in the regeneration of the methanol. This also enables recovery of the sulfur present using downstream processes such as for example the Claus process.

After passing through what are usually a plurality of regeneration steps, a plurality of substreams of the scrubbing medium freed of disruptive components, i.e in the Rectisol process typically methanol, are recycled to the absorber column. The scrubbing medium regenerated by hot regeneration has the highest purity and is therefore used for fine scrubbing or fine absorption of already prepurified synthesis gas; it thus constitutes the final scrubbing stage before the purified synthesis gas leaves the absorber column, typically at its upper end, as pure synthesis gas. The scrubbing medium regenerated by flash regeneration has somewhat lower purity and is in particular still partially laden with carbon dioxide. This scrubbing medium is used in the so-called $CO_2$ main scrub which, from the perspective of the synthesis gas that passes through the absorber column, is arranged upstream of the fine scrubbing, i.e. typically below the fine scrubbing stage.

Obtained as the bottoms product of the hot regeneration is a water-containing methanol stream which is passed to a methanol-water separating column and subjected to distillative fractionation therein. The obtained tops product of this distillation is a methanol stream depleted in water which is recycled into the process. The water obtained as the bottoms product is discharged from the process.

It is known that production of synthesis gas from heavy metal-containing fuels forms metal carbonyls which compromise the use of synthesis gas in a multiplicity of chemical syntheses. Within the Rectisol process in the presence of $H_2S$ these metal carbonyls form finely dispersed/colloidal metal sulfides which form encrustations on available surfaces, thus swiftly resulting in obstructions or blockages of the affected plant parts. On account of the temperatures prevailing there and the presence of $H_2S$ the hot regeneration in particular provides favorable conditions for decomposition of the metal carbonyls dissolved in the methanol and subsequent formation of the corresponding metal sulfides.

A process for purifying synthesis gas containing metal carbonyls by means of a low-temperature gas scrub with methanol and subsequent regeneration of the methanol by decompression, evacuation, stripping and heating with additional treatment in a pre-reactor is more particularly described in German patent document DE 26 10 582. This process is said to prevent deposits of insoluble heavy metal compounds, in particular of metal sulfides formed from the metal carbonyls, in the regeneration columns of gas scrubs, thus extending their uptimes. However even when employing this process, metal carbonyls not converted in the pre-reactor, carbonyls dissolved in the pre-scrubbing methanol and metal carbonyls degassed in the pre-reactor, still partially pass into the synthesis gas intended for further chemical reactions.

A further process for removal of metal carbonyl compounds in the context of the purification of synthesis gases by low-temperature gas scrubbing is known from German laid-open specification DE 43 36 790. In this process, before entry into a regeneration column, a heavily laden substream and a lightly laden substream are heated with scrubbing liquid and each supplied to a reactor. The lightly laden substream of the scrubbing liquid is then in each case supplied to a separate delay time reactor together with the condensate generated during the partial condensation of the vapours from the condensation system of the regeneration column. However, this process does not allow complete conversion of the metal carbonyls and removal of the sulfides either.

Removal of the finely dispersed or colloidal metal sulfides formed from the metal carbonyls i.e. in particular iron pentacarbonyl $Fe(CO)_5$ and nickel tetracarbonyl $Ni(CO)_4$ is therefore a pressing problem in the Rectisol gas scrub in order to prevent deposits thereof in the separating column and other plant parts. Solutions which allow cleaning during planned shutdowns have by now been found for most of the at-risk plant parts. The solutions for controlling deposits of colloidal metal sulfides on the trays of the methanol-water column as yet still have room for improvement.

To remove the metal sulfides it is proposed in German patent document DE 103 366 77 B4 before introduction into the methanol-water column to initially introduce the scrubbing solution into a precipitation vessel in which the colloidal metal sulfides formed from the metal carbonyls are agglomerated by heating to form larger particles which are subsequently discharged from the separating column together with the bottoms product. One disadvantage here are the increased capital costs of the required precipitation vessel. The operating costs are also increased since the required precipitation conditions, for example temperature and residence time, must be established in the precipitation vessel. Also disadvantageous are the increased space requirements within the gas scrubbing plant associated with the installation of a precipitation vessel.

SUMMARY

The invention accordingly has it for its object to specify a process which avoids the recited disadvantages of the processes know from the prior art and in which in particular the metal sulfides are either removed or transferred into a form which no longer results in encrustations in the various plant parts and the column trays.

This object is substantially achieved by a process having the features of Claim 1. Further especially preferred embodiments of the process according to the invention are found in the subsidiary claims. The invention further relates to a plant for performing such a process.

Process According to the Invention

Process for removal of acidic gas constituents, in particular of carbon dioxide ($CO_2$) and hydrogen sulfide ($H_2S$), from a crude synthesis gas containing $CO_2$, $H_2S$, water and metal carbonyls with methanol as the scrubbing medium, comprising the steps of:
a) supplying the crude synthesis gas to an absorption apparatus,
b) contacting the crude synthesis gas with a cold methanol substream and with at least one further methanol substream recycled from downstream process stages in the absorption apparatus to obtain a product gas stream depleted in acidic gas constituents, water and metal carbonyls which is discharged from the process and to obtain a methanol substream laden with acidic gas constituents, water and metal carbonyls,
c) multistage regeneration of the laden methanol substream by pressure reduction (flashing) and/or temperature elevation (hot regeneration) to obtain at least one regenerated methanol substream which is recycled to process step b), to further obtain one or more carbon dioxide- and/or hydrogen sulfide-containing gas streams which are discharged from the process and to obtain a methanol substream containing water and metal sulfides and depleted in acidic gas constituents,
d) introducing the methanol substream containing water and metal sulfides and depleted in acidic gas constituents into a methanol-water separating column, distillative fractionation thereof in the methanol-water separating column into a methanol-containing tops product that is at least partially recycled to process step b) and/or step c) and into a water-containing bottoms product that is discharged from the process, characterized in that
e) water is added directly into the feed conduit of the methanol substream containing water and metal sulfides and depleted in acidic gas constituents before the introduction thereof into the methanol-water separating column and/or in that
f) water is injected directly into the methanol-water separating column at at least one point.

Plant According to the Invention

Plant for removal of acidic gas constituents, in particular of carbon dioxide ($CO_2$) and hydrogen sulfide ($H_2S$), from a crude synthesis gas containing $CO_2$, $H_2S$, water and metal carbonyls with methanol as the scrubbing medium, comprising the following constituents and assemblies in fluid connection with one another:
a) means for supplying the crude synthesis gas to an absorption apparatus,
b) an absorption apparatus, means for supplying the crude synthesis gas, a cold methanol substream and at least one further methanol substream recycled from downstream process stages to the absorption apparatus, means for discharging a product gas stream depleted in acidic gas constituents, water and metal carbonyls and a methanol substream laden with acidic gas constituents, water and metal carbonyls,
c) one or more apparatuses for multi-stage regeneration of the laden methanol substream by pressure reduction (flashing) and/or temperature elevation (hot regeneration), means for supplying the laden methanol substream to the regeneration apparatuses, means for recycling at least one regenerated methanol substream to the absorption apparatus, means for discharging one or more carbon dioxide- and/or hydrogen sulfide-containing gas streams from the regeneration apparatuses, means for discharging a methanol substream containing water and metal sulfides and depleted in acidic gas constituents from the regeneration apparatuses,
d) a methanol-water separating column, means for introducing the methanol substream containing water and metal sulfides and depleted in acidic gas constituents into the methanol-water separating column, means for discharging and recycling a methanol-containing tops product to the absorption apparatus and/or to the regeneration apparatuses, means for discharging a water-containing bottoms product, characterized in that the plant further comprises a methanol-water separating column and means e) which allow addition of water directly into the feed conduit of the methanol substream containing water and metal carbonyls and depleted in acidic gas constituents before the introduction thereof into the methanol-water separating column and/or which f) allow injection of water directly into the methanol-water separating column at at least one point.

An addition of water directly into the feed conduit to the methanol-water separating column is to be understood as meaning in particular the absence of mixing, buffering, precipitation or other vessels used for contacting the added water with the water-containing methanol before entry into the separating column.

A methanol-rich or water-rich environment is to be understood as meaning a liquid phase in which the respective component predominates and in particular has a higher concentration than the other component. A methanol- and water-containing system would accordingly be described as methanol-rich when the amount of substance fraction of methanol is greater than that of water.

A person skilled in the art is capable of measuring the degree of transferral of the metal sulfides from a methanol-rich or water-rich environment by sampling and routine measurements. Such analytical methods are known from the prior art.

Fluid connection between two regions is to be understood as meaning any type of connection which makes it possible for a fluid, for example the liquid scrubbing medium, to flow from the one to the other of the two regions irrespective of any interposed regions, components, valves or apparatuses.

Any reported pressures in the unit bar(a) relate to absolute pressure in bar (absolute) unless otherwise stated in an individual case.

The invention is based on the finding that metal sulfide particles exhibit different behaviour in a methanol-rich environment and a water-rich environment. In a methanol-rich environment the metal sulfide particles remain predominantly dispersed, i.e. have only a low propensity for sedimentation, but have a propensity for adhesion to surfaces. By contrast, in a water-rich environment an agglomeration of small metal sulfide particles to afford larger aggregates which precipitate and have little if any adhesion propensity occurs preferentially. Surprisingly, this effect may be utilized directly in the methanol-water separating column without requiring a precipitation vessel to be connected upstream thereof.

Preferred Embodiments of the Invention

One preferred embodiment of the process according to the invention is characterized in that in process step e) the addition of water is carried out such that the residence time of the obtained mixture in the feed conduit before introduction into the methanol-water separating column is sufficient to bring about a transferral of the metal sulfides from a methanol-rich environment to a water-rich environment of at least 50%, preferably at least 90%, most preferably at least 95%. During the transferral of the metal sulfide particles from the methanol-rich environment into a water-rich environment the abovementioned behaviour of the metal sulfide particles is observed and becomes all the more pronounced the more complete the transferral of the metal sulfides.

Accordingly, the residual content of metal sulfide particles in the methanol-rich environment and thus also the risk of formation of encrustations in parts of the methanol-water column falls with an increasing degree of transferral.

It has proven particularly advantageous when in process step e) the addition point of the water into the feed conduit of the methanol substream containing water and metal sulfides and depleted in acidic gas constituents is arranged such that a residence time of at least 5 s, preferably at least 10 s, before entry into the methanol-water separating column is maintained, wherein the flow rate of the methanol-water mixture in the feed conduit is between 0.5 and 2.0 m/s, preferably between 1.0 and 1.5 m/s. Investigations have shown that observing these criteria makes it possible to achieve a particularly effective removal of the metal sulfide particles together with the water-containing bottoms product of the methanol-water separating column.

It has been found in practice that good commixing is generally achieved upon the arrangement of the addition point of the water in the feed conduit at least 5 m upstream of the methanol-water separating column.

In a preferred process embodiment in process step f) the added amount of water is between 3% and 50%, preferably between 5% and 15%, of the amount of feed to the methanol-water separating column, i.e. of the supplied amount of the methanol-water mixture to be fractionated. Investigations have shown that observing this minimum injection amount makes it possible to achieve a particularly effective removal of the metal sulfide particles together with the water-containing bottoms product of the methanol-water separating column.

It is apparent from operating experience that under customary operating conditions of the methanol-water separating column the formation of encrustations/deposits by metal sulfides is reliably prevented upon injection of at least 100 l/h of water per injection point.

In a further aspect of the process according to the invention the metal sulfides are discharged from the process with the water-containing bottoms product of the methanol-water separating column. This is possible since despite the increased agglomerization propensity of small metal sulfide particles to afford larger aggregates in the water-rich environment, formation of very large metal sulfide aggregates no longer dischargeable from the column bottom surprisingly does not take place. On the contrary, the metal sulfide particles may be readily discharged from the process together with the water-containing bottoms product of the methanol-water separating column with customary conveying apparatuses, for example pumps.

A further, preferred process embodiment is characterized in that for the water addition in process step e) or f) at least one water-containing stream selected from the group of: water from a $CO_2$ offgas scrubber, bottoms product from the methanol-water separating column, fresh water, demineralized water is used. All of these water-containing stream are suitable for bringing about the above-described agglomeration behaviour of the metal sulfide particles. This applies to the respective water-containing streams alone or in admixture with other water-containing streams from the recited group.

In a further, preferred process embodiment the water stream used for the water addition in process step e) or f) has a temperature between 10° C. and 140° C., preferably between 60° C. and 120° C. Investigations have shown that the temperatures within the recited temperature ranges make it possible to achieve a particularly effective removal of the metal sulfide particles together with the water-containing bottoms product of the methanol-water separating column.

BRIEF DESCRIPTION OF THE DRAWING

Further features, advantages and possible applications of the invention are also apparent from the following description of a working and numerical example and the drawing. All described and/or depicted features on their own or in any desired combination form the subject matter of the invention, irrespective of the way in which they are combined in the claims and the way in which said claims refer back to one another.

FIG. 1 is a schematic representation of an exemplary embodiment of the process according to the invention/the plant according to the invention.

DETAILED DESCRIPTION OF PREFERRED EMBODIMENTS

FIG. 1 is a schematic diagram of a methanol-water separating column 1 inside the scrubbing medium workup of a plant for gas scrubbing of crude synthesis gas with cryogenic methanol operating according to the Rectisol process.

Via conduit 10, control valve 11 and conduit 12, regenerated methanol scrubbing medium from the methanol hot regeneration (not depicted in the FIGURE) is supplied to the separating column and applied thereto in the upper part thereof in proximity to the column top via liquid distributor 78. In addition separating column 1 is supplied via conduit 20, control valve 21 and conduit 22 with a methanol-water mixture likewise originating from the methanol hot regeneration which is applied thereto in the middle column region via liquid distributor 75.

In the present working example the separating column 1 is fitted with structured packing segments 70, 71, 72, 73 which are used to adjust the vapour-liquid equilibrium of the components involved. The separating column may alternatively be fitted with trays or dumped random packing bodies; this has no substantial effect on the functioning of the invention. The energy input required for distillative fractionation of the methanol-water mixture is provided via reboiler 60 in which a portion of the bottoms product supplied via conduit 66 evaporates and the vapour/the heated vapour-liquid mixture is recycled to the separating column via conduit 65. The heating of the reboiler is effected by means of steam applied to the reboiler via conduit 61. The condensate thus generated is discharged via conduit 62.

Methanol vapour depleted in water is withdrawn from the top of the separating column and recycled to the methanol hot regeneration via conduit 50. Discharging of bottoms product enriched in water is effected via conduit 40, control valve 41 and conduit 42. The bottoms product is supplied to a workup not depicted in the FIGURE or is removed from the process.

According to the invention demineralized water is now additionally supplied via conduit 30. In the present example this originates from a gas scrubber by means of which methanol traces were removed from the $CO_2$ stream discharged from the Rectisol plant before discharge thereof to the atmosphere. The demineralized water is supplied via conduit 34, control valve 35, conduit 36, shutoff valve 37 and conduit 38 to the separating column 1 and applied thereto via liquid distributor 77.

Alternatively or in addition the entirety of the water stream supplied via conduit 30 or a substream thereof may be sent via conduit 31, control valve 32 and conduit 33 to the methanol-water mixture supplied via conduit 20 and combined therewith in conduit 22. The water stream or a substream then enters the separating column together with the methanol-water mixture via liquid distributor 75.

It is also possible by appropriate opening/closing of the shutoff valves 24, 27, 37 to introduce into the separating column a substream or the entirety of the water stream via conduit route 30, 34, 36, 23, 25 and liquid distributor 76. Water input via conduit route 26, 28, 22 is also possible. In order to allow finer control/better distribution of the water on the liquid distributors it is also possible to replace one or more shutoff valves with control valves.

The choice of water addition points via liquid distributors 75, 76, 77 will depend in particular on which parts of the separating column are particularly severely affected by deposits or encrustations of metal sulfide particles. This is based on relevant operating experience or may be determined by corresponding experiments without water addition.

INDUSTRIAL APPLICABILITY

The invention provides a gas scrubbing process for removal of acidic gas constituents from synthesis gas containing metal carbonyls which makes it possible to reliably discharge the metal sulfide particles formed from the metal carbonyls via the column bottom of the methanol-water separating column without encrustations or obstructions occurring therein and without additional equipment parts such as for example precipitation vessels being required.

LIST OF REFERENCE NUMERALS 1 separating column
10 conduit
11 control valve
12 conduit
20 conduit
21 control valve
22 conduit
23 conduit
24 shutoff valve
25 conduit
26 conduit
27 shutoff valve
28 conduit
30 conduit
31 conduit
32 control valve
33 conduit
34 conduit
35 control valve
36 conduit
37 shutoff valve
38 conduit
40 conduit
41 control valve
42 conduit
50 conduit
60 reboiler
61 conduit
62 conduit
65 conduit
66 conduit
70 structured packing
71 structured packing 72 structured packing
73 structured packing
75 liquid distributor
76 liquid distributor
77 liquid distributor
78 liquid distributor It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for removal of carbon dioxide and hydrogen sulfide from a crude synthesis gas containing $CO_2$, $H_2S$, water and metal carbonyls, with methanol as a scrubbing medium, comprising:
   a) supplying the crude synthesis gas to an absorption apparatus,
   b) contacting the crude synthesis gas with a cold methanol sub-stream and with at least one further methanol sub-stream recycled from downstream process stages in the absorption apparatus to obtain a product gas stream depleted in acidic gas constituents, water and metal carbonyls which is discharged from the process, and to obtain a methanol sub-stream laden with acidic gas constituents, water and metal carbonyls,
   c) multistage regeneration of the laden methanol sub-stream by pressure reduction and/or temperature elevation to obtain at least one regenerated methanol sub-stream which is recycled to process step b), to further obtain one or more carbon dioxide- and/or hydrogen sulfide-containing gas streams which are discharged from the process and to obtain a methanol sub-stream containing water and metal sulfides and depleted in acidic gas constituents,
   d) introducing the methanol sub-stream containing water and metal sulfides and depleted in acidic gas constituents into a methanol-water separating column, distillative fractionation thereof in the methanol-water separating column into a methanol-containing tops product that is at least partially recycled to process step b) and/or step c) and into a water-containing bottoms product that is discharged from the process,
   wherein,
   e) water is added directly into a feed conduit of the methanol sub-stream containing water and metal sulfides and depleted in acidic gas constituents before the introduction thereof into the methanol-water separating column, and
   f) demineralized water is injected directly into the methanol-water separating column at at least one point.

2. The process according to claim 1, wherein in process step e) the addition of water is carried out such that the residence time of the obtained mixture in the feed conduit before introduction into the methanol-water separating column is sufficient to bring about a transferral of the metal sulfides from a methanol-rich environment to a water-rich environment of at least 50%.

3. The process according to claim 1, wherein in process step e) the addition point of the water into the feed conduit of the methanol sub-stream containing water and metal sulfides and depleted in acidic gas constituents is arranged such that residence time of at least 5 s before entry into the methanol-water separating column is maintained, wherein the flow rate of the methanol-water mixture in the feed conduit is between 0.5 and 2.0 m/s.

4. The process according to claim 3, wherein in process step e) the addition point of the water into the feed conduit of the methanol sub-stream containing water and metal sulfides and depleted in acidic gas constituents is located at least 5 m upstream of the methanol-water separating column.

5. The process according to claim 1, wherein in process step f) the added amount of water is between 3% and 50% of the amount of feed to the methanol-water separating column.

6. The process according to claim 5, wherein at least 100 l/h of water are injected per injection point.

7. The process according to claim 1, wherein the metal sulfides are discharged from the process with the water-containing bottoms product of the methanol-water separating column.

8. The process according to claim 1, wherein for the water addition in process step e) or f) at least one water-containing stream selected from the group of: water from a $CO_2$ off-gas scrubber, bottoms product from the methanol-water separating column, fresh water, demineralized water is used.

9. The process according to claim 1, wherein the water stream used for the water addition in process step e) or f) has a temperature between 10° C. and 140° C.

10. A plant for removal of carbon dioxide and hydrogen sulfide from a crude synthesis gas containing $CO_2$, $H_2S$, water and metal carbonyls with methanol as a scrubbing medium, comprising the following constituents and assemblies in fluid connection with one another:
   a) a means for supplying the crude synthesis gas to an absorption apparatus,
   b) an absorption apparatus, means for supplying the crude synthesis gas, a cold methanol sub-stream and at least one further methanol sub-stream recycled from downstream process stages to the absorption apparatus, means for discharging a product gas stream depleted in acidic gas constituents, water and metal carbonyls and a methanol sub-stream laden with acidic gas constituents, water and metal carbonyls,
   c) one or more apparatuses for multi-stage regeneration of the laden methanol sub-stream by pressure reduction (flashing) and/or temperature elevation (hot regeneration), means for supplying the laden methanol sub-stream to the regeneration apparatuses, means for recycling at least one regenerated methanol sub-stream to the absorption apparatus, means for discharging one or more carbon dioxide-and/or hydrogen sulfide-containing gas streams from the regeneration apparatuses, means for discharging a methanol sub-stream containing water and metal sulfides and depleted in acidic gas constituents from the regeneration apparatuses,
   d) a methanol-water separating column, means for introducing the methanol sub-stream containing water and metal sulfides and depleted in acidic gas constituents into the methanol-water separating column, means for discharging and recycling a methanol-containing tops product to the absorption apparatus and/or to the regeneration apparatuses, means for discharging a water-containing bottoms product,
   further comprising a methanol-water separating column and means
   e) which allow addition of water directly into a feed conduit of the methanol sub-stream containing water and metal carbonyls and depleted in acidic gas constituents before the introduction thereof into the methanol-water separating column and which allow injection of demineralized water directly into the methanol-water separating column at at least one point.

\* \* \* \* \*